United States Patent
Mery

(10) Patent No.: US 11,920,787 B2
(45) Date of Patent: Mar. 5, 2024

(54) SYSTEM AND METHOD FOR BURNING GAS EMITTED FROM AN INSTRUMENT

(71) Applicant: Reuven Mery, Kiryat Ata (IL)

(72) Inventor: Reuven Mery, Kiryat Ata (IL)

( * ) Notice: Subject to any disclaimer, the term of this patent is extended or adjusted under 35 U.S.C. 154(b) by 140 days.

(21) Appl. No.: 16/753,476

(22) PCT Filed: Oct. 7, 2018

(86) PCT No.: PCT/IL2018/051088
§ 371 (c)(1),
(2) Date: Apr. 3, 2020

(87) PCT Pub. No.: WO2019/069314
PCT Pub. Date: Apr. 11, 2019

(65) Prior Publication Data
US 2020/0256561 A1    Aug. 13, 2020

(30) Foreign Application Priority Data

Oct. 6, 2017   (IL) .......................................... 254906

(51) Int. Cl.
| | |
|---|---|
| *F23D 14/20* | (2006.01) |
| *F23G 7/06* | (2006.01) |
| *F23L 7/00* | (2006.01) |
| *F23N 1/10* | (2006.01) |
| *G01N 30/02* | (2006.01) |
| *G01N 30/34* | (2006.01) |

(52) U.S. Cl.
CPC .............. *F23N 1/102* (2013.01); *F23D 14/20* (2013.01); *F23G 7/065* (2013.01); *F23L 7/007* (2013.01); *F23D 2207/00* (2013.01); *F23N 2229/00* (2020.01); *G01N 2030/025* (2013.01); *G01N 30/34* (2013.01)

(58) Field of Classification Search
CPC ...... F23N 1/102; F23N 2229/00; F23G 7/065; F23L 7/007; G01N 30/34; G01N 2030/025
USPC ............................................................ 431/5
See application file for complete search history.

(56) References Cited

U.S. PATENT DOCUMENTS

| | | |
|---|---|---|
| 3,086,848 A | 4/1963 | Reinecke |
| 3,399,039 A | 8/1968 | Taft |

(Continued)

FOREIGN PATENT DOCUMENTS

JP          5845966 B2      1/2016

*Primary Examiner* — Avinash A Savani
(74) *Attorney, Agent, or Firm* — William H. Dippert; Laurence A. Greenberg; Werner H. Stemer

(57) ABSTRACT

The present subject matter provides a burner configured to burn a gas released from an instrument, for example a gas chromatography instrument, the burner comprising: a burning chamber; a gas inlet, configured to allow entry of the gas from the instrument into the burning chamber; an oxygen mix inlet, configured to allow entry of an oxygen mix into the burning chamber; a flammable gas inlet, configured to allow entry of a flammable gas into the burning chamber, and an igniter, capable of igniting gases in the burning chamber. A system for controlling the burning of a gas emitted from an instrument, a method for burning a gas emitted from an instrument, and a method for using a flammable gas as a carrier gas in a gas chromatography instrument, are also provided, as well as various embodiments thereof.

18 Claims, 3 Drawing Sheets

(56) References Cited

U.S. PATENT DOCUMENTS

| | | | | |
|---|---|---|---|---|
| 3,399,974 | A | * | 9/1968 | Spencer .............. G01N 27/626 |
| | | | | 436/154 |
| 3,695,844 | A | * | 10/1972 | Wise et al. ............ G01N 30/34 |
| | | | | 436/154 |
| 4,311,664 | A | * | 1/1982 | Zaremba ................ G01N 21/72 |
| | | | | 422/89 |
| 4,798,805 | A | * | 1/1989 | Issenmann ............ G01N 31/12 |
| | | | | 436/154 |
| 4,843,016 | A | * | 6/1989 | Fine ....................... G01N 31/12 |
| | | | | 436/116 |
| 5,797,358 | A | | 8/1998 | Brandt et al. |
| 6,205,841 | B1 | | 3/2001 | Shibamoto |
| 8,587,319 | B1 | | 11/2013 | Bolinger et al. |
| 2003/0064335 | A1 | | 4/2003 | Canon |
| 2008/0121015 | A1 | * | 5/2008 | Heuvel .................. G01N 30/34 |
| | | | | 73/23.4 |
| 2014/0260540 | A1 | * | 9/2014 | O'Neil .................. G01N 30/12 |
| | | | | 73/23.42 |
| 2015/0015885 | A1 | * | 1/2015 | Garff ..................... G01N 30/68 |
| | | | | 356/417 |

* cited by examiner

SYSTEM AND METHOD FOR BURNING GAS EMITTED FROM AN INSTRUMENT

CROSS-REFERENCE TO RELATED APPLICATIONS

This patent application is a U.S. National Phase filing under 35 U.S.C. § 371 of PCT Patent Application No. PCT/IL2018/051088, filed Oct. 7, 2018, which is based upon and claims the priority of Israeli Patent Application No. 254906, filed Oct. 6, 2017, each of which is incorporated herein by reference in its entirety.

FIELD

The present subject matter relates to instruments emitting gas. More particularly, the present subject matter relates to systems and methods for burning deleterious gases emitted from instruments.

BACKGROUND

Instruments emitting gases, particularly deleterious gases, are widely used in laboratories and in industrial settings, for example gas chromatography instruments, gas chromatography—mass spectrometry instruments, vacuum pumps, chemical vent hoods and the like. Various types of deleterious gases are emitted from such instruments, including flammable gases, toxic gases, carcinogenic gases, irritating gases, corrosive gases and the like.

For illustrative purposes only, a gas chromatography instrument is discussed herein as an exemplary instrument emitting deleterious gases. Gas chromatography (GC) is a type of chromatography used in analytical chemistry for separating and analyzing compounds that can be vaporized without decomposing. Typical uses of GC include testing the purity of a particular substance, separating different components of a mixture, determining the relative amounts of such components, or in some situations, assist in identifying a compound. In preparative chromatography, GC can be used to prepare pure compounds from a mixture.

Hydrogen, nitrogen, and helium can be used as carrier gas in GC instruments, however, helium is the most commonly used carrier gas although hydrogen is preferred for improved separations. The stationary phase is a microscopic layer of liquid or polymer in an inert solid support placed within a column. The gaseous compounds being analyzed elute from the column with the carrier gas at different retention times.

FIG. 1 schematically illustrates, according to an exemplary embodiment, a schematic diagram of a prior art GC instrument. A prior art GC instrument 2 comprises a carrier gas source 202 fluidically connected to a flow controller 204 that is fluidically connected to an entrance of a column 206. A sample injector 208 is also fluidically connected to the entrance of the column 206, downstream the flow controller 204. The column 206 is positioned in a thermostatic oven 210. An exit of the column 206 is fluidically connected to a detector 212. The detector 212 may be connected, for example, to a monitor 216 as illustrated in FIG. 1, to a data storage device, and/or any data display and storage means.

A carrier gas flows from the carrier gas source 202 through the flow controller 204 that is configured to control the flow of the carrier gas, into the column 206 that is heated to a desired temperature by the thermostatic oven 210. A sample is injected into the column 206 through the sample injector 208 and the gases are eluted from the column 206 through the detector 212, which detects the compounds eluted from the column 206. Data from the detector 212 is transferred to a display means like a monitor 216, a data storage means like data storage device, or any combination thereof.

As mentioned above, hydrogen should be the most preferable carrier gas in GC instruments in terms of price, accuracy, duration of analysis and separation capabilities, in comparison to helium which is the most commonly used carrier gas. For example, the price of hydrogen gas is 0.7 US Dollars per kg, compared to helium that costs 52 US Dollars per kg. However, despite its advantages, hydrogen is barely used in GC instruments as carrier gas because it is a highly flammable gas and may be prone to fires. Helium, on the other hand, is much safer and therefore widely used as a carrier gas in GC instruments despite its disadvantages compared to hydrogen.

SUMMARY

Unless otherwise defined, all technical and scientific terms used herein have the same meaning as commonly understood by one of ordinary skill in the art to which this subject matter belongs. Although methods and materials similar or equivalent to those described herein can be used in the practice or testing of the present subject matter, suitable methods and materials are described below. In case of conflict, the patent specification, including definitions, will control. In addition, the materials, methods, and examples are illustrative only and not intended to be limiting.

According to one aspect of the present subject matter, there is provided a burner configured to burn a gas released from an instrument, the burner comprising:
  a burning chamber;
  a gas inlet, configured to allow entry of the gas from the instrument into the burning chamber;
  an oxygen mix inlet, configured to allow entry of an oxygen mix into the burning chamber;
  a flammable gas inlet, configured to allow entry of a flammable gas into the burning chamber, and
  an igniter, capable of igniting gases in the burning chamber.

According to one embodiment, the burner further comprises a flame detector, configured to detect the presence of a flame in the burning chamber.

According to another embodiment, the burner is an external unit that is configured to be connected to an existing instrument.

According to yet another embodiment, the burner is part of the instrument.

According to still another embodiment, the instrument is a gas chromatography (GC) instrument.

According to a further embodiment, the gas comprises a flammable carrier gas.

According to yet a further embodiment, the flammable carrier gas is hydrogen.

According to still a further embodiment, the gas is released from an injection port of the GC instrument.

According to another aspect of the present subject matter, there is provided a system for controlling the burning of a gas emitted from an instrument, the system comprising:
  a burner configured to burn a gas emitted from an instrument, the burner comprising:
    a burning chamber;
    a gas inlet, configured to allow entry of the gas emitted from the instrument into the burning chamber;

an oxygen mix inlet, configured to allow entry of an oxygen mix into the burning chamber;

a flammable gas inlet, configured to allow entry of a flammable gas into the burning chamber;

an igniter, capable of igniting gases in the burning chamber, and a flame detector, configured to detect the presence of a flame in the burning chamber;

a controller configured to control an activity of the instrument and the burner;

a flammable gas source fluidically connected to the burner through the controller;

an oxygen mix source fluidically connected to the burner through the controller, and a power source electrically connected to the burner and the instrument through the controller, wherein the controller is configured to receive signals from the flame detector of the burner, and accordingly control the activity of the instrument, or the burner, or the instrument and the burner.

According to one embodiment, the controller is configured to shut off supply of power to the instrument in case a "no flame" signal is received from the flame detector.

According to another embodiment, the controller is configured to switch on the igniter of the burner, by supplying power to the igniter, in case a "no flame" signal is received from the flame detector.

According to yet another embodiment, the controller is configured to control a flow rate of a flammable gas to the burner.

According to still another embodiment, the controller is configured to control a flow rate of an oxygen mix to the burner.

According to a further embodiment, the burner is an external unit that is configured to be connected to an existing instrument.

According to yet a further embodiment, the burner is part of the instrument.

According to still a further embodiment, the instrument is a GC instrument and the gas is a GC gas.

According to an additional embodiment, the controller is configured to send a signal to the GC instrument to stop the running of a sample in a column of the GC instrument while the GC instrument is still on.

According to yet an additional embodiment, the controller is configured to shut off supply of carrier gas to the GC instrument in case a "no flame" signal is received from the flame detector.

According to still an additional embodiment, the GC gas comprises a flammable carrier gas.

According to another embodiment, the flammable carrier gas is hydrogen.

According to yet another embodiment, the gas is released from an injection port of the GC instrument.

According to yet another aspect of the present subject matter, there is provided a method for burning a gas emitted from an instrument, the method comprising:

providing an oxygen mix and a flammable gas to a burner configured to burn a gas emitted from an instrument;

igniting a flame in the burner, and directing the gas emitted from the instrument to the burner.

According to still another aspect of the present subject matter, there is provided a method for using a flammable gas as a carrier gas in a GC instrument, the method comprising:

providing a flammable carrier gas to the GC instrument;

providing an oxygen mix and a flammable gas to a burner configured to burn a gas released from a GC instrument;

igniting a flame in the burner, and directing the flammable carrier gas released from the GC instrument to the burner.

BRIEF DESCRIPTION OF THE DRAWINGS

Embodiments are herein described, by way of example only, with reference to the accompanying drawings. With specific reference now to the drawings in detail, it is stressed that the particulars shown are by way of example and for purposes of illustrative discussion of the preferred embodiments, and are presented in the cause of providing what is believed to be the most useful and readily understood description of the principles and conceptual aspects of the embodiments. In this regard, no attempt is made to show structural details in more detail than is necessary for a fundamental understanding, the description taken with the drawings making apparent to those skilled in the art how several forms may be embodied in practice.

In the drawings.

DESCRIPTION OF THE PREFERRED EMBODIMENTS

Figure 1:
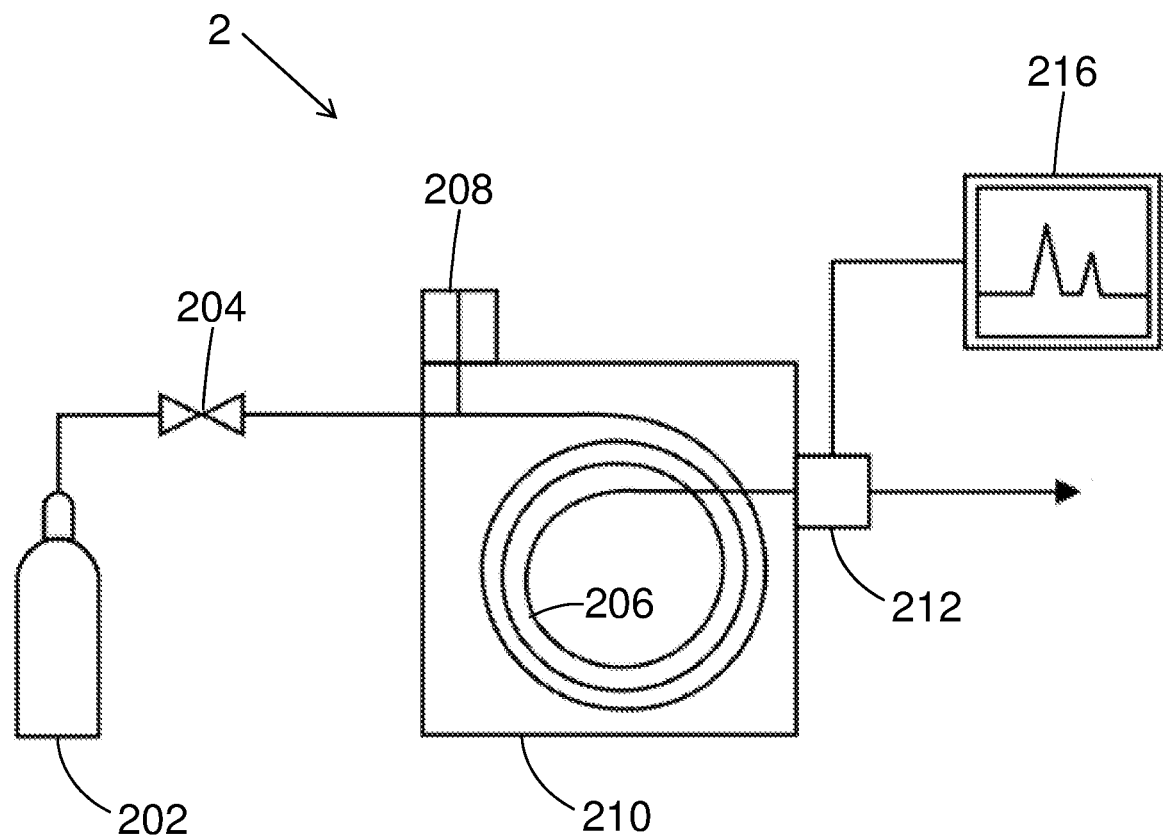
FIG. 1 schematically illustrates, according to an exemplary embodiment, a schematic diagram of a prior art GC instrument.

Before explaining at least one embodiment in detail, it is to be understood that the subject matter is not limited in its application to the details of construction and the arrangement of the components set forth in the following description or illustrated in the drawings. The subject matter is capable of other embodiments or of being practiced or carried out in various ways. Also, it is to be understood that the phraseology and terminology employed herein is for the purpose of description and should not be regarded as limiting. In discussion of the various figures described herein below, like numbers refer to like parts. The drawings are generally not to scale.

For clarity, non-essential elements were omitted from some of the drawings.

As described above, instruments emitting gases, particularly deleterious gases, are widely used in laboratories and in industrial settings. For illustrative purposes only, a gas chromatography instrument is discussed herein as an exemplary instrument emitting deleterious gases. It should be noted that the gas chromatography instrument is only exemplary and should not be considered as limiting the scope of the present subject matter, but rather the present subject matter is related to any instrument emitting deleterious gases known in the art.

In currently available GC instruments, the amount of sample is very small, in the range of substantially 0.1-1 microliter. However, handling such small sample is impossible, and therefore, carrier gas in high excess is used to carry the sample within the GC column. Excess sample and carrier gas that does not enter the column is released to the ambient atmosphere through two tubes termed septum purge and split. It is well recognized that usage of a flammable carrier gas, such as hydrogen, is dangerous due to the possibility of ignition or explosion of the excess carrier gas that is released to the ambient atmosphere.

An aim of the present subject matter is to enable safe usage of instruments emitting deleterious gases, for example instruments using flammable gases, like hydrogen, as a carrier gas in GC instruments. Various aspects and embodiments of the present subject matter that provide a solution for the challenge of safely using a deleterious gas in an instrument, for example a flammable gas as a carrier gas in GC instruments, are disclosed herein.

The term "gas" as disclosed herein refers to any type of a deleterious gas, or a mixture of deleterious gases, known in the art that are emitted from an instrument, for example flammable gases, toxic gases, carcinogenic gases, irritating gases, corrosive gases and the like. More particularly, the term "gas" as disclosed herein refers to either a flammable gas released from a GC instrument, or a mixture of gases released from a GC instrument, wherein at least one of the gases in the mixture is flammable. According to one embodiment, the gas is released from an injection port of the GC instrument. Examples of a gas include, but not limited to, an excess flammable carrier gas, a mixture of carrier gas and analytes, a combination thereof, and the like.

The present subject matter provides a burner configured to burn a gas in a controlled manner, thus reducing the risk of ignition and explosion of the gas or exposure of individuals to the gas.

Figure 2:
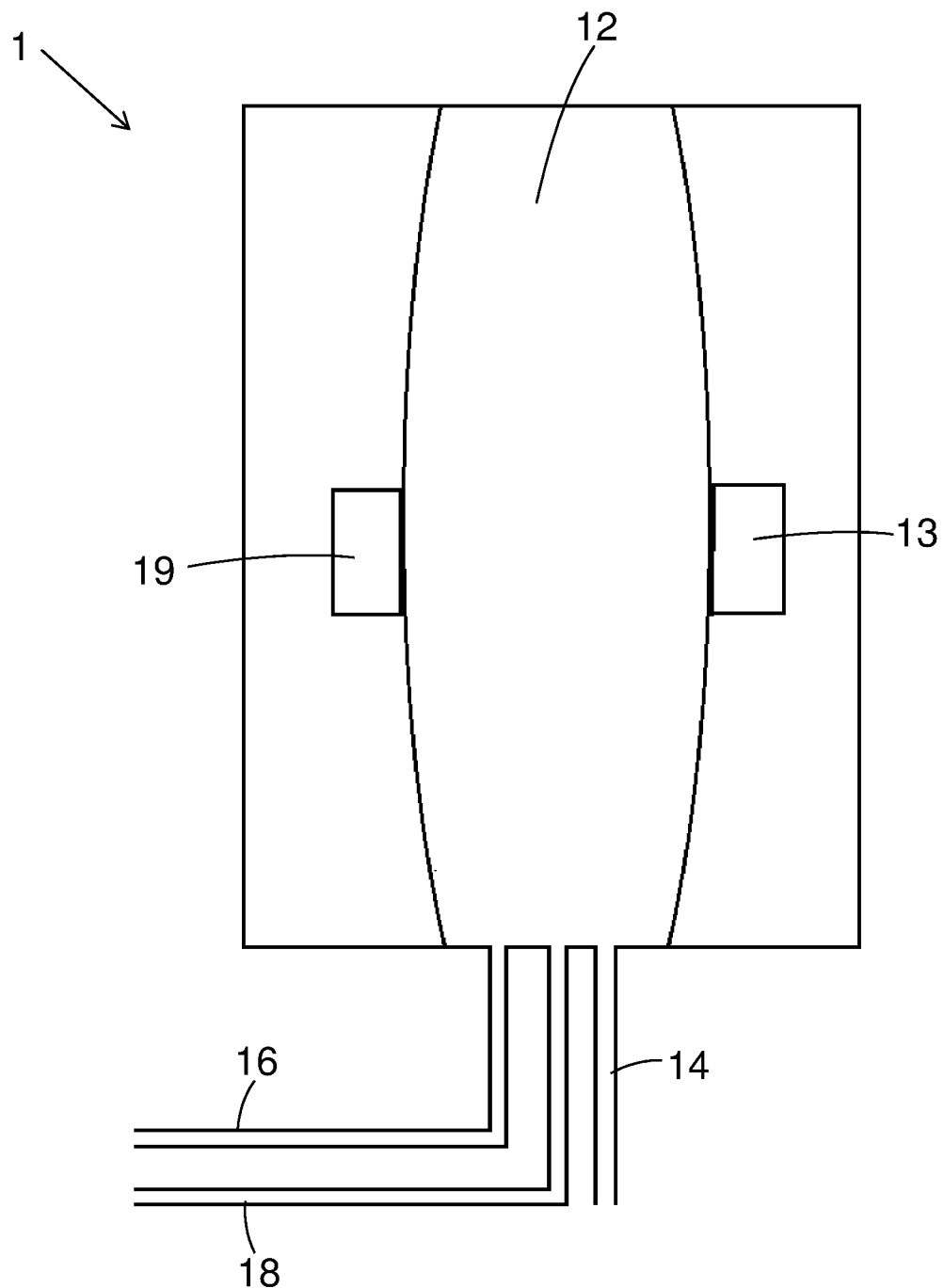
FIG. 2 schematically illustrates, according to an exemplary embodiment, a burner.

FIG. 2 schematically illustrates, according to an exemplary embodiment, a burner 1 configured to burn gas. An exemplary gas is hydrogen used as a carrier gas in GC instruments. The burner 1 comprises a burning chamber 12, a gas inlet 14, an oxygen mix inlet 16, a flammable gas inlet 18 and an igniter 13.

The term "oxygen mix" as disclosed herein refers to any mixture of gases comprising oxygen, for example, but not limited to, atmospheric air, pure oxygen, a combination thereof, and the like.

The amount of gas that is released from a GC instrument is usually not enough for maintaining a constant flame in the burning chamber 12. Therefore, in order to keep a constant flame in the burning chamber 12, an oxygen mix and a flammable gas are constantly supplied to the burning chamber 12. According to one exemplary embodiment, the supply of oxygen mix and/or flammable gas to the burning chamber 12 is controlled.

According to another exemplary embodiment, the gas inlet 14 fluidically connects a gas exit of a GC instrument, for example a septum purge tube and/or a split tube of a GC instrument, with the burning chamber 12. The gas inlet 14 is configured to allow entry of a gas from a GC instrument into the burning chamber 12.

According to another embodiment, the oxygen mix inlet 16 fluidically connects an oxygen mix source with the burning chamber 12. The oxygen mix inlet 16 is configured to allow entry of an oxygen mix into the burning chamber 12, for example from an oxygen mix source. Any type of oxygen mix source is under the scope of the present subject matter, for example but not limited to, ambient atmospheric air, atmospheric air pump, atmospheric air container, pressurized atmospheric air container, pure oxygen container, oxygen generator, a container containing a mixture of gases comprising oxygen, a combination thereof, and the like.

According to yet another embodiment, the flammable gas inlet 18 fluidically connects a flammable gas source with the burning chamber 12. The flammable gas inlet 18 is configured to allow entry of a flammable gas into the burning chamber 12. Any type of source of a flammable gas and any type of flammable gas is under the scope of the present subject matter. Examples of a flammable gas include, but not limited to, hydrogen, propane, butane, methane, a combination thereof, and the like. Examples of a flammable gas source include, but not limited to, gas generator, pressurized gas container, mains gas supply, flammable carrier gas source of a GC instrument, a combination thereof, and the like.

According to still another embodiment, the igniter 13 is positioned in the burning chamber 12 and is configured to ignite flammable gases present in the burning chamber 12. Any type of igniter 13 known in the art is under the scope of the present subject matter, for example but not limited to, incandescent igniter, spark igniter, flame igniter, a combination thereof, and the like.

According to a further embodiment, the burner 1 further comprises a flame detector 19 configured to detect the presence of a flame in the burning chamber 12. Any type of flame detector 19, working in any mechanism known in the art, is under the scope of the present subject matter, for example but not limited to, optical flame detection, flame ionization detection, temperature sensing, a combination thereof, and the like.

According to one embodiment, the components constructing the burner 1 are made of any non-flammable material known in the art. According to another embodiment, the components constructing the burner 1 are made of any thermal insulating material known in the art.

According to one embodiment, the burner 1 is an external unit that is configured to be connected to an existing GC instrument such as GC 2 shown in FIG. 1. According to another embodiment, the burner 1 is part of GC instrument, namely the GC instrument is manufactured with the burner 1 built-in.

Figure 3:
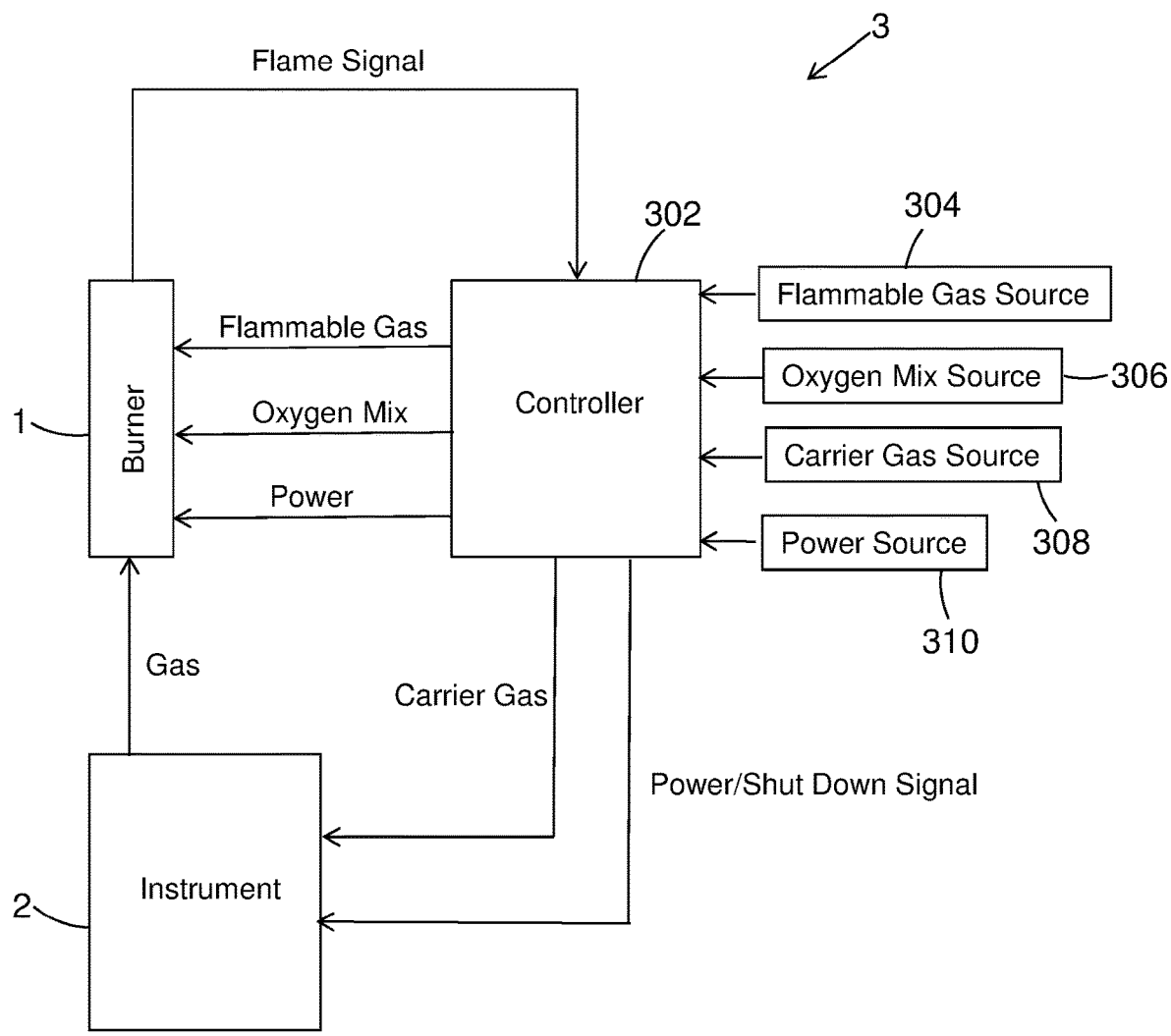
FIG. 3 schematically illustrates, according to an exemplary embodiment, a system for controlling the burning of a gas emitted from an instrument.

FIG. 3 schematically illustrates, according to an exemplary embodiment, a system for controlling the burning of a gas emitted from an instrument. According to one embodiment, the system 3 comprises a controller 302 configured to control the activity of an instrument 2, for example a GC instrument 2 and a burner 1. The instrument 2 is any instrument emitting a deleterious gas, or a mixture of deleterious gases, for example a prior art GC instrument, as illustrated in FIG. 1. The burner 1 is illustrated in FIG. 2.

According to one embodiment, a flammable gas source 304 is fluidically connected to the burner 1 through the controller 302. Embodiments of the flammable gas source 304 are described above in relation to FIG. 2. According to another embodiment, an oxygen mix source 306 is fluidically connected to the burner 1 through the controller 302. Embodiments of the oxygen mix source 306 are described above in relation to FIG. 2. According to yet another embodiment, a carrier gas source 308 is fluidically connected to GC instrument 2 through the controller 302. Furthermore, an exit of a gas of the instrument 2 is fluidically connected to the burner 1 as described above in relation to FIG. 2. According to a further embodiment, a power source 310 is electrically connected to the instrument 2 through the controller 302. According to yet a further embodiment, the power source 310 is electrically connected to the burner 1 through the controller 302. According to an additional embodiment, the flame detector 19 of the burner 1 is communicatively connected to the controller 302.

According to one embodiment, the controller 302 is configured to control supply of power to the instrument 2 according to the activity of the burner 1. For example, during operation of the instrument 2, gas released from the instrument 2 is burnt in the burner 1. During that time, the flame detector 19 detects a flame in the burning chamber 12 and transmits a "flame on" signal, which is received by the controller 302. In response, the controller 302 allows supply of power to the instrument 2. If the flame in the burning chamber 12 is extinguished, a "no flame" signal is transmitted from the flame detector 19 to the controller 302. As a response, the controller 302 may execute one of two optional actions, According to one embodiment, the controller 302 may shut off the power supply to the instrument 2 in order to avoid operation of the instrument 2 that can result in release of gas, which is deleterious, without being burnt. According to another embodiment, the controller 302 may transmit a signal to the instrument 2 that stops operation of the instrument 2, for example stops running of a sample in a column 206 of a GC instrument (see FIG. 1), while the instrument 2 is still on.

According to another embodiment, the controller 302 is configured to control supply of power to the burner 1, for example supply of power to the igniter 13 and/or the flame detector 19, if necessary. For example, when a "no flame" signal is transmitted from the flame detector 19 and the signal is received by the controller 302, the controller 302 may switch on the igniter 13 in order to ignite the gases present in the burning chamber 12, by supplying power to the igniter 13.

According to still another embodiment, the controller 302 is configured to control supply of gas to the instrument 2, for example supply of carrier gas to a GC instrument 2, in a manner similar to the control of power supply to the instrument 2 described above. For example, as long as the flame detector 19 transmits a "flame on" signal to the controller 302, the controller 302 allows supply of a gas to the instrument 2. If a "no flame" signal is transmitted from the flame detector 19 and the signal is received by the controller 302, the controller 302 shuts off the supply of gas to the GC instrument 2.

According to one embodiment, the flow rate of flammable gas and/or oxygen mix to the burner 1 may be controlled manually, for example by an operator of the instrument 2. According to another embodiment, the flow rate of flammable gas/or and oxygen mix to the burner 1 is controlled by the controller 302. According to one embodiment, the flow rate of flammable gas to the burner 1 is in the range of substantially 1-1,000 ml/min. According to another embodiment, the flow rate of oxygen mix to the burner 1 is in the range of substantially 1-10,000 ml/min.

According to one embodiment, the controller 302 is configured to supply a notification and/or an alarm when the controller 302 receives a "no flame" signal from the flame detector 19, and shuts off the instrument 2, either by shutting off supply of power to the instrument 2, and/or by shutting off supply of gas to the instrument 2. Any type of notification and/or alarm is under the scope of the present subject matter, for example but not limited to, vocal notification, visual notification, and the like. According to one embodiment, the notification and/or alarm is transmitted by wired communication lines. According to another embodiment, the notification and/or alarm is transmitted by wireless communication lines.

Any type of controller 302 is under the scope of the present subject matter, for example but not limited to, a controller 302 that operates electronically, a controller 302 that operates mechanically, a combination thereof, and the like.

According to one embodiment, the controller 302 is an external unit that is configured to be connected to an existing instrument 2. According to another embodiment, the controller 302 is part of the instrument 2, namely the instrument 2 is manufactured with the controller 302 built-in.

According to one embodiment, the system 3 comprises at least one instrument 2. According to another embodiment, each instrument 2 is connected to a burner 1. According to yet another embodiment, a plurality of instruments 2 are connected to a burner 1, namely the burner 1 is configured to burn a gas released from multiple GC instruments 2.

The present subject matter also provides a method for burning a gas emitted from an instrument, the method comprising:
providing an oxygen mix and a flammable gas to a burner configured to burn a gas emitted from an instrument;
igniting a flame in the burner, and
directing the gas emitted from the instrument to the burner.

The present subject matter further provides a method for using a flammable gas as a carrier gas in a GC instrument, the method comprising:
providing a flammable carrier gas to the GC instrument;
providing an oxygen mix and a flammable gas to a burner configured to burn a gas released from a GC instrument;
igniting a flame in the burner, and
directing the flammable carrier gas released from the GC instrument to the burner.

It is appreciated that certain features of the subject matter, which are, for clarity, described in the context of separate embodiments, may also be provided in combination in a single embodiment. Conversely, various features of the subject matter, which are, for brevity, described in the context of a single embodiment, may also be provided separately or in any suitable sub combination.

Although the subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A gas chromatography (GC} instrument comprising a sample injector that is fluidically connected to a gas entrance; a thermostatic oven, and a burner configured to burn a gas released from the GC instrument, the burner comprising: a burning chamber; a gas inlet fluidically connected to the sample injector, wherein the gas inlet is configured to allow entry of the gas from the sample injector into the burning chamber; an oxygen mix inlet, configured to allow entry of an oxygen mix into the burning chamber; a flammable gas inlet, configured to allow entry of a flammable gas into the burning chamber; and an igniter, capable of igniting gases in the burning chamber.

2. A gas chromatography (GC) instrument system comprising:
a GC instrument that comprises a sample injector fluidically connected to a gas inlet and a thermostatic oven capable of heating a sample, wherein the GC instrument is capable of releasing deleterious gases;
a burner configured to burn the deleterious gases released from the GC instrument, the burner comprising:
a burning chamber;
a gas inlet fluidically connected to the GC instrument, said gas inlet being configured to allow entry of the deleterious gases;

an oxygen mix inlet configured to allow entry of an oxygen mix into the burning chamber;

a flammable gas inlet configured to allow entry of a flammable gas into the burning chamber; and an igniter capable of igniting gases in the burning chamber; and a controller.

3. The GC instrument system of claim 2, wherein the system further comprises:

a controller configured to control an activity of the instrument and the burner;

a flammable gas source fluidically connected to the burner through the controller;

an oxygen mix source fluidically connected to the burner through the controller; and a power source electrically connected to the burner and the instrument through the controller, wherein the controller is configured to receive signals from a flame detector of the burner and control the activity of the instrument, the burner, or the instrument and the burner.

4. The GC instrument of claim 1, wherein the burner is an external unit that is configured to be connected to the sample injector.

5. The GC instrument of claim 1, wherein the gas comprises a flammable carrier gas.

6. The GC instrument of claim 4, wherein the flammable carrier gas is hydrogen.

7. The GC instrument of claim 1, wherein the gas is released from an injection port of the GC instrument.

8. The GC instrument of claim 1, wherein the burner further comprises:

a controller configured to control an activity of the instrument and the burner;

a flammable gas source fluidically connected to the burner through the controller;

an oxygen mix source fluidically connected to the burner through the controller; and a power source electrically connected to the burner and the instrument through the controller, wherein the controller is configured to receive signals from the flame detector of the burner, and accordingly control the activity of the instrument, or the burner, or the instrument and the burner.

9. The GC instrument of claim 8, wherein the controller is configured to shut off supply of power to the instrument in case a "no flame" signal is received from the flame detector.

10. The GC instrument of claim 8, wherein the controller is configured to control a flow rate of a flammable gas to the burner.

11. The GC instrument of claim 8, wherein the controller is configured to control a flow rate of an oxygen mix to the burner.

12. The GC instrument of claim 8, wherein the burner is an external unit that is configured to be connected to the sample injector.

13. The GC instrument of claim 8, wherein the controller is configured to send a signal to the GC instrument to stop the running of a sample in a column of the GC instrument while the GC instrument is still on.

14. The GC instrument of claim 8, wherein the controller is configured to shut off supply of carrier gas to the GC instrument in case a "no flame" signal is received from the flame detector.

15. The GC instrument of claim 8, wherein the gas comprises a flammable carrier gas.

16. The GC instrument of claim 8, wherein the gas is released from an injection port of the GC instrument.

17. A method for burning a gas emitted from a GC instrument, the method comprising:

providing a GC instrument according to claim 1;

providing an oxygen mix and a flammable gas to the burner;

igniting a flame in the burner; and directing the gas emitted from the sample injector that is fluidically connected to the gas entrance of the instrument to the burner.

18. The GC instrument of claim 1, wherein the flame detector is working in a mechanism of optical flame detection, flame ionization detection, or temperature sensing, or any combination thereof.

* * * * *